United States Patent
Tang (10) Patent No.: US 12,489,288 B2
(45) Date of Patent: Dec. 2, 2025

(54) MULTI-PHASE AC VOLTAGE FAULT DETECTION BASED ON VIRTUAL VOLTAGE

(71) Applicant: L3Harris Technologies, Inc., Melbourne, FL (US)

(72) Inventor: Lixin Tang, Irvine, CA (US)

(73) Assignee: L3Harris Technologies, Inc., Melbourne, FL (US)

( * ) Notice: Subject to any disclaimer, the term of this patent is extended or adjusted under 35 U.S.C. 154(b) by 161 days.

(21) Appl. No.: 18/493,008

(22) Filed: Oct. 24, 2023

(65) Prior Publication Data
US 2025/0132554 A1 Apr. 24, 2025

(51) Int. Cl.
*H02H 3/16* (2006.01)
*G01R 19/02* (2006.01)
*G01R 19/25* (2006.01)

(52) U.S. Cl.
CPC ............ *H02H 3/165* (2013.01); *G01R 19/02* (2013.01); *G01R 19/2513* (2013.01)

(58) Field of Classification Search
CPC .... H02H 3/165; G01R 19/02; G01R 19/2513; G01R 31/42
USPC ........................ 324/522, 512, 500
See application file for complete search history.

(56) References Cited

U.S. PATENT DOCUMENTS

| | | | |
|---|---|---|---|
| 2013/0158924 A1 | 6/2013 | Bucsa et al. | |
| 2017/0296056 A1* | 10/2017 | Hresko | G16H 40/40 |
| 2020/0001048 A1* | 1/2020 | Oren | G06T 7/70 |
| 2020/0309841 A1* | 10/2020 | Sharon | G01R 31/086 |
| 2020/0338351 A1* | 10/2020 | Panken | A61N 1/0534 |
| 2022/0155383 A1* | 5/2022 | Yang | G01R 19/16566 |
| 2024/0079869 A1* | 3/2024 | Madani | H02J 13/00002 |

* cited by examiner

*Primary Examiner* — Giovanni Astacio-Oquendo
(74) *Attorney, Agent, or Firm* — Edell, Shapiro & Finnan, LLC (57) ABSTRACT

In an embodiment, voltage fault detection is performed for alternating current (AC) multi-phase power systems based on a reconstructed or virtual voltage signal derived from voltage samples captured in a shortened sample window to reduce fault detection time. The embodiment of the present disclosure constructs the virtual voltage signal (emulating the root mean square (RMS) voltage of any of the phases) from the voltage samples captured from signals of the multi-phase power system. The embodiment of the present disclosure employs a shortened sample window of T/2/N (N is the number of phases ≥3) to capture the voltage samples, thereby reducing measurement and fault detection delay. The virtual voltage signal is used determine root mean square (RMS) voltage for voltage fault detection.

20 Claims, 10 Drawing Sheets

MULTI-PHASE AC VOLTAGE FAULT DETECTION BASED ON VIRTUAL VOLTAGE

TECHNICAL FIELD

The present disclosure relates to alternating current (AC) voltage fault detection, and, more specifically, to fault detection of AC voltage based on a reconstructed or virtual voltage signal derived from a shortened sampling interval to reduce fault detection time.

BACKGROUND

In multi-phase alternating current (AC) power or converter/inverter systems, root-mean-square (RMS) values of a variable (typically voltage) are needed for converter control or condition monitoring and protection. RMS value measurements utilize a large sample window of the variable (period of a signal (T) or half-period of the signal (T/2)), thereby generating a delay in fault detection. This delay defers correctional actions and adversely affects the system transient performance and reliability.

DESCRIPTION OF EXAMPLE EMBODIMENTS

Overview

In an embodiment, voltage fault detection is performed for alternating current (AC) multi-phase power systems based on a reconstructed or virtual voltage signal derived from voltage samples captured in a shortened sample window to reduce fault detection time. The embodiment of the present disclosure constructs the virtual voltage signal (emulating the root mean square (RMS) voltage of any of the phases) from the voltage samples captured from signals of a multi-phase power system. The embodiment of the present disclosure employs a shortened sample window of T/2/N (N is the number of phases ≥3) to capture the voltage samples, thereby reducing measurement and fault detection delay. The virtual voltage signal is used to determine root mean square (RMS) voltage for voltage fault detection. By way of example, an embodiment may be used in a static transfer switch system to achieve significant improvement of fault detection and transfer times. These improvements can be translated into less voltage interruptions to critical loads. However, the embodiment may be used in any application which desires fast RMS value calculation.

EXAMPLE EMBODIMENTS

An embodiment of the present disclosure performs voltage fault detection for alternating current (AC) power systems based on a reconstructed or virtual voltage signal derived from a shortened sampling interval to reduce fault detection time. For example, conventional approaches utilize a sample window of T/2 (half-period of a signal) to calculate accurate root mean square (RMS) voltage of a three-phase power system. The embodiment of the present disclosure may construct a virtual voltage signal (emulating the root mean square (RMS) voltage of any of the phases) and employ a sample window of T/6 for the three-phase power system (which is a third of the sample window for conventional approaches), thereby reducing measurement and fault detection delay. Accordingly, the embodiment provides quick and accurate RMS calculation which is critical to system transient performance and reliability. In addition, reduced fault detection time of the embodiment enables early correctional actions, thereby significantly improving transient performance.

The embodiment of the present disclosure utilizes sampled voltages from all three phases to construct a new voltage signal (or virtual voltage signal) that emulates the root mean square (RMS) voltage of any of the phases. In other words, the virtual voltage signal has the same root mean square (RMS) value in a symmetric sinusoidal three-phase system as any of the measured voltages. The embodiment can be used in any three-phase alternating current (AC) power converter/inverter or power system which desires fast RMS voltage detection/calculation.

The embodiment may be applied to a static transfer switch system (e.g., static automatic bus transfer (SABT) system, etc.) switching between power sources in response to a voltage fault detection as described below, and may be used to measure root mean square (RMS) values of other alternating current (AC) signals in three-phase AC systems. In addition, embodiments of the present disclosure may further be utilized for any N phase power system (e.g., where N≥3). In this case, a virtual voltage signal may be determined using a sample window of T/2/(N phases) to calculate RMS voltage. Accordingly, the embodiments provide a significantly smaller sample window than the conventional sample window of T/2 to reduce fault detection time.

Figure 1:
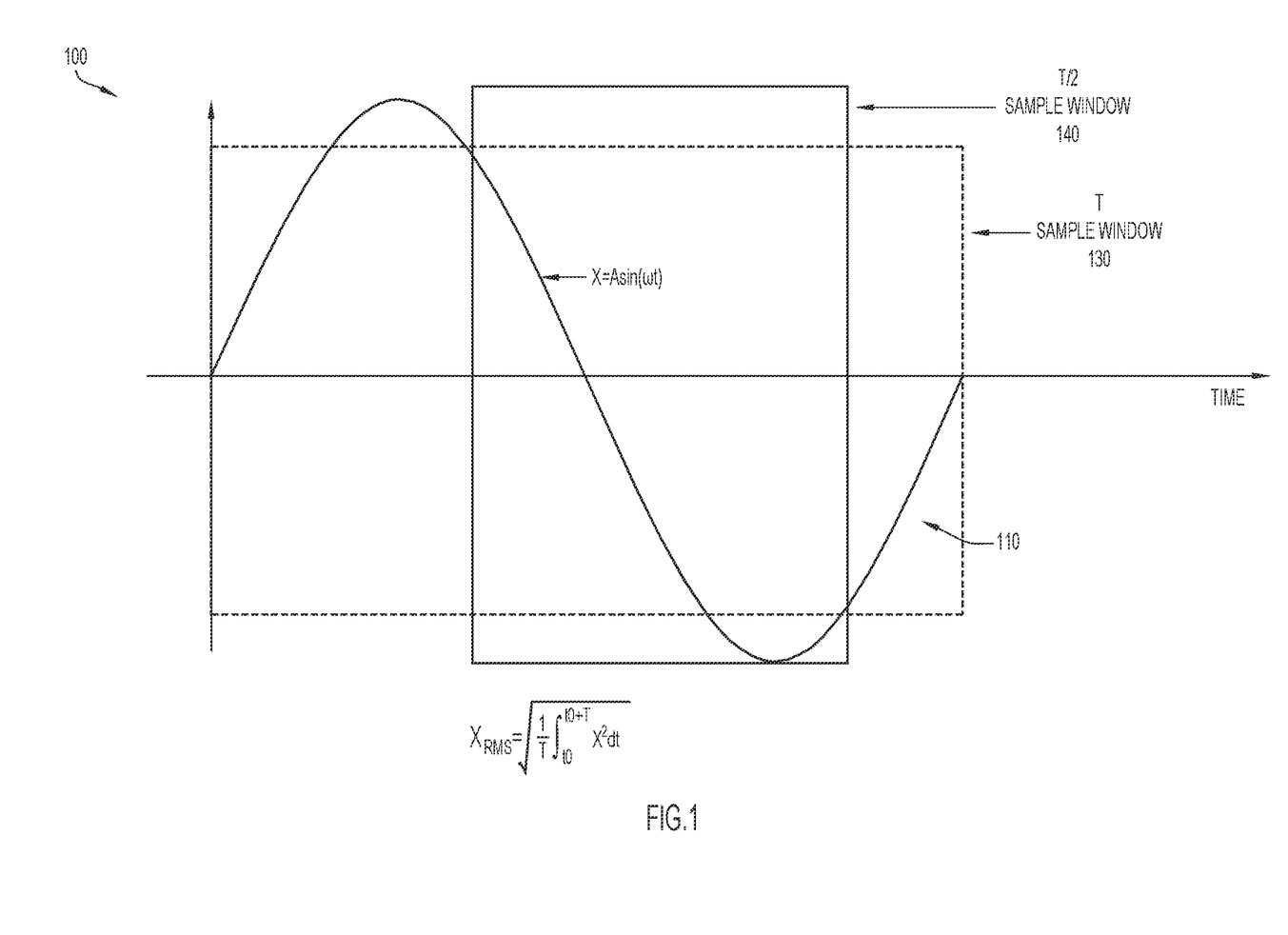
FIG. 1 is a graphical illustration of a sample window for an example signal.

FIG. 1 illustrates a graphical plot 100 of an instantaneous voltage signal. Voltage signal 110 is an alternating current (AC) signal having a sinusoidal waveform (e.g., X=Asin(ωt+φ), where X is the voltage, A is the magnitude or amplitude, and ωt+φ is the angle and includes a reference point or angle, ωt, representing the angular motion (or reference angle) over time t and a phase or offset from the reference angle, φ). In this example case, the phase or offset, q, is zero which produces the expression X=Asin (ωt) shown in FIG. 1. A root mean square (RMS) measurement uses a sample window 130 of duration T (the period of the signal (or 2π)). An RMS measurement, $X_{RMS}$, is determined from voltage samples, X, collected during sample window 130, and may be expressed as:

$$X_{RMS} = \sqrt{\frac{1}{T}\int_{t0}^{t0+T} X^2 dt}$$

With pure alternating current (AC) waveforms (having no direct current (DC) component), a halved sample window 140 of T/2 (half the period of the signal (or π)) may be used for root mean square (RMS) measurements in conventional approaches.

Figure 2:
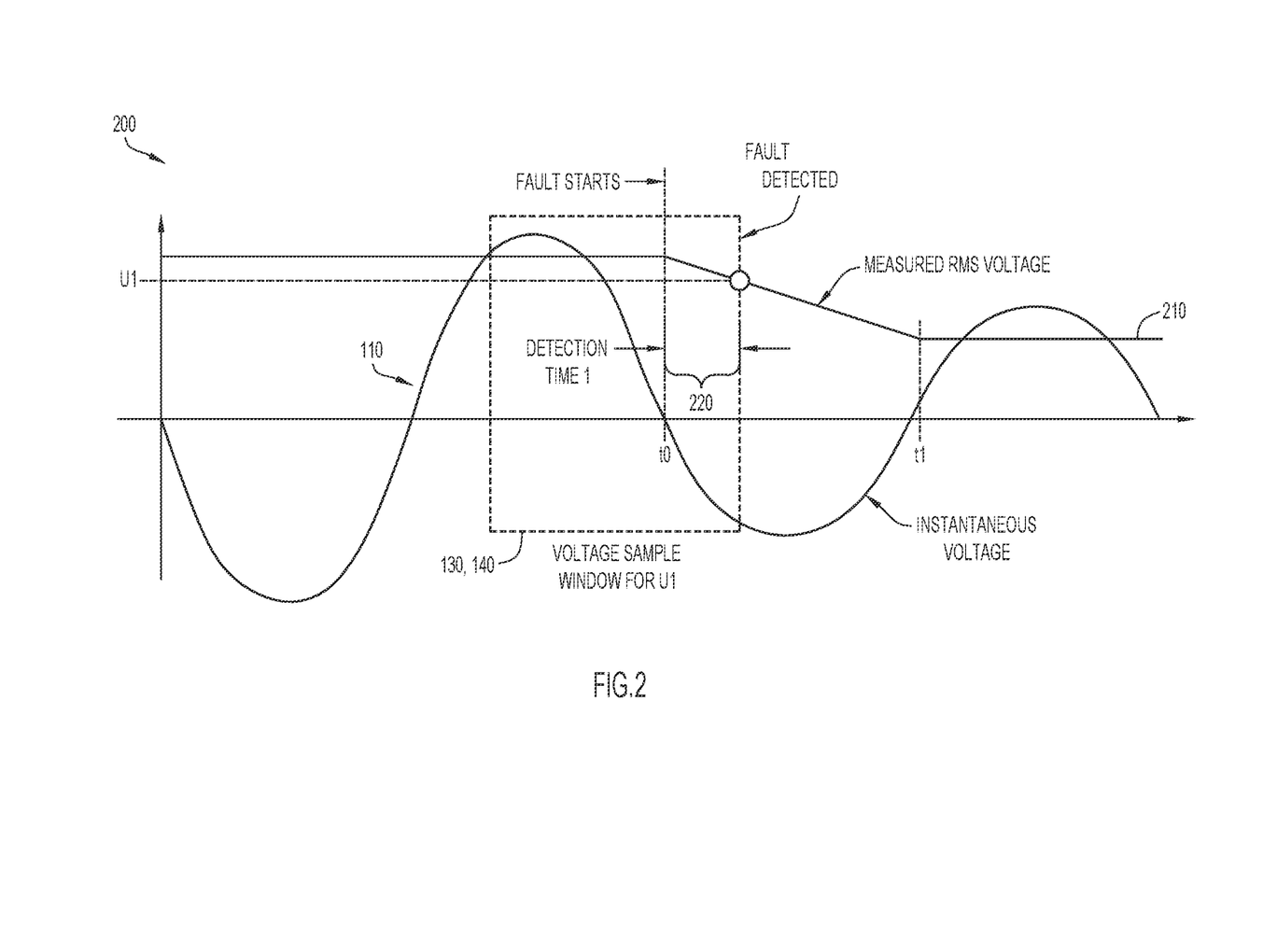
FIG. 2 is a graphical illustration of example voltage fault detection based on root mean square (RMS) voltage values.

With continued reference to FIG. 1, FIG. 2 illustrates a graphical plot 200 of instantaneous voltage signal 110 and a corresponding measured root mean square (RMS) voltage 210. The voltage signal is an alternating current (AC) signal having a sinusoidal waveform as described above. The voltage signal is sampled in sample window 130, 140. A voltage fault may occur when the RMS measurement attains or exceeds an overvoltage (OV) threshold or attains or falls below an undervoltage (UV) threshold. By way of example, plot 200 indicates an undervoltage threshold (e.g., U1 as shown in FIG. 2) which is used to trigger a voltage fault. For example, when the RMS voltage equals or falls below the undervoltage threshold, U1, a voltage fault has occurred.

Plot 200 illustrates, by way of example, that a drop in instantaneous voltage signal 110 starts at a time, t0, within sample window 130, 140. The RMS voltage settles down and attains the undervoltage threshold, U1, at the end of sample window 130, 140, thereby producing a voltage fault. Detection time 220 is the time between the start of the voltage drop (time t1) and the time of the detection (or end of the sample window). In this case, voltage fault detection time is related to multiple factors, such as sample window delay, fault trigger level, fault time, and variation of voltage.

Figure 3:
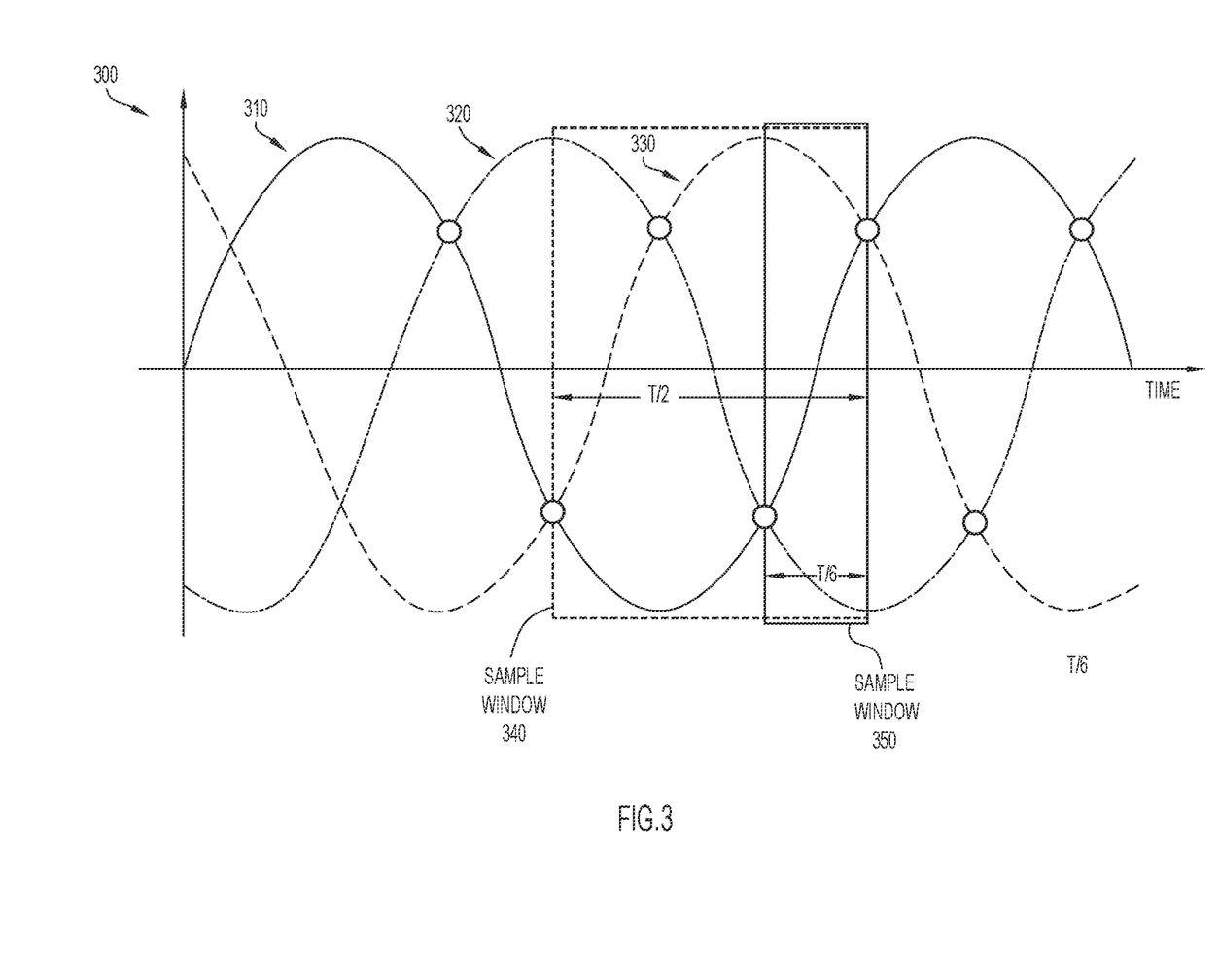
FIG. 3 is a graphical illustration of a sample window of a conventional approach for sampling signals from a multi-phase power system relative to a sample window according to an embodiment of the present disclosure.

With continued reference to FIGS. 1-2, FIG. 3 illustrates a graphical plot 300 of instantaneous voltage of signals 310, 320, and 330 from a three-phase power system. Voltage signals 310, 320, and 330 are alternating current (AC) signals each having a sinusoidal waveform substantially similar to the sinusoidal waveform described above. The phase difference between signals 310 and 320, and between signals 320 and 330, are the same (e.g., 2π/(N phases)=2π/3 (or 120°)).

In a three-phase system, a conventional approach for root mean square (RMS) calculation uses a sample window 340 of duration T/2 (half the period, T, of the signal (or π)). However, embodiments of the present disclosure may use a sample window 350 of duration T/2/(N phases), or T/6 for a three-phase system). The embodiments construct a virtual voltage signal (e.g., for a period of T/2) that emulates the root mean square (RMS) voltage of any of the phases. Thus, the virtual voltage signal may be used to perform the RMS calculation as described below. By way of example, the AC voltage signals may have a frequency of 60 Hz and present embodiments may sample at a rate to obtain 32 samples per half-period (or 3.84 kHz). However, any suitable sampling rate (or sample window) may be used (e.g., a rate of 10 kHz or more, etc.).

With continued reference to FIGS. 1-3, FIG. 4 illustrates a method 400 of voltage fault detection according to an embodiment of the present disclosure. Initially, samples from corresponding voltage signals of a three-phase power system (e.g., voltage signals 310, 320, and 330 (FIG. 3)) are captured in a sample window at operation 405. The voltage signals are alternating current (AC) signals each having a sinusoidal waveform as described above. The duration of the sample window is T/2/(N phases) (e.g., T/2/3=2π/6=π/3, where T (the period of the signals)=2π and N=3 phases). This duration is a shortened or reduced duration relative to a duration of T/2 (half of the period of the signals) for conventional approaches.

Figure 4:
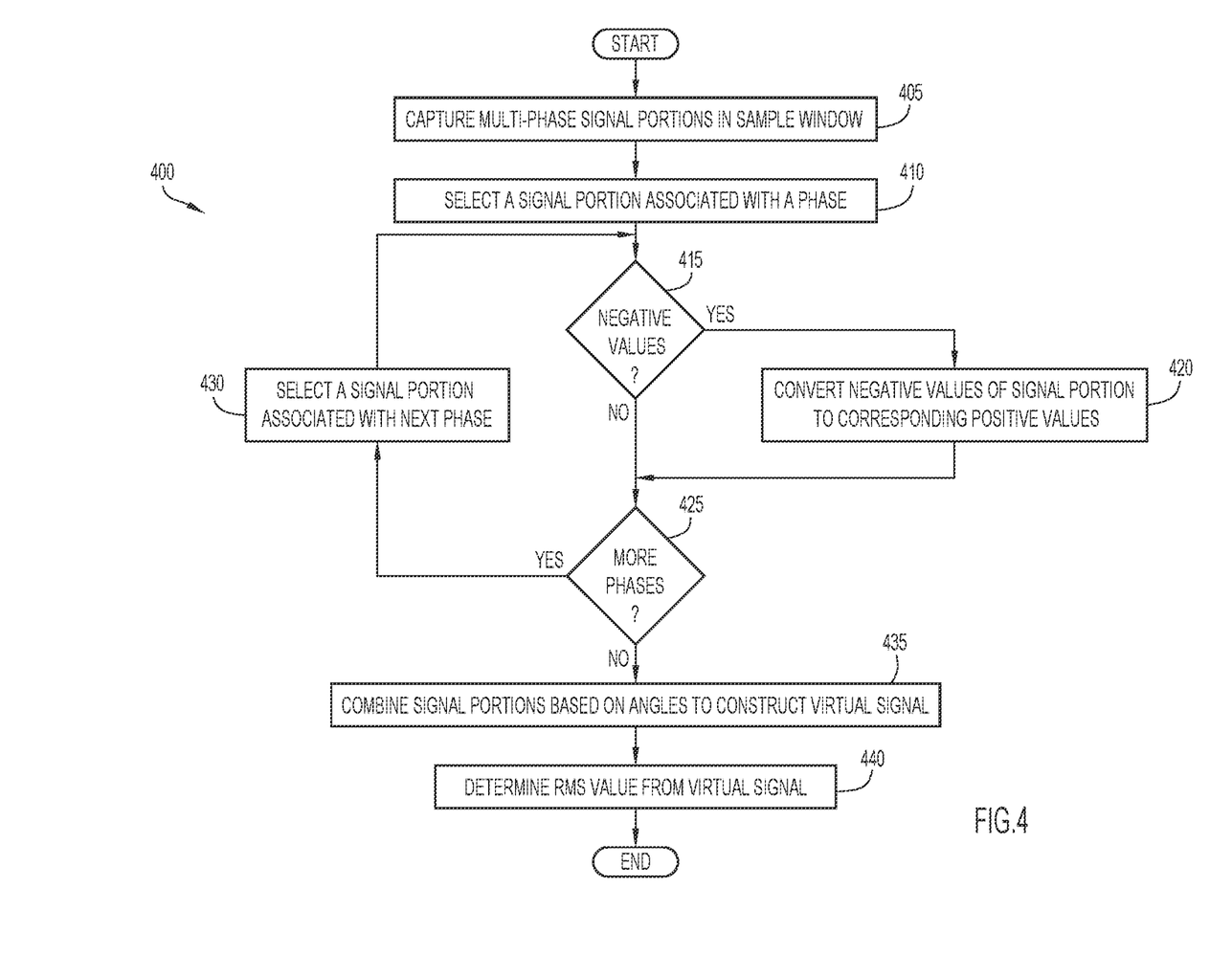
FIG. 4 is a procedural flowchart of a method of voltage fault detection according to an embodiment of the present disclosure.

A signal portion associated with a phase within the sample window is selected at operation 410. When the selected signal portion includes voltage samples with negative values as determined at operation 415, the negative values are converted to corresponding positive values of the signal at operation 420. For example, the angle (or angle range) of the signal portion with negative values is adjusted (or shifted to) to portions of the signal with corresponding positive values. This may be accomplished based on trigonometric properties (e.g., −Sin(θ)=Sin(θ+π)). Thus, shifting the angle (or angle range) of a signal portion with negative values (by a half-period (or π)) provides the signal portion with corresponding positive values. By way of example, a negative voltage, −X, at Sin(θ) has a corresponding positive voltage, X, at Sin(θ+π). The new or shifted angle (or angle range) is used to convert the negative samples to positive values for, and order, the signal portion for a virtual voltage signal. The signal portions with positive values maintain their current angle (or angle range).

When signal portions of additional phases are present as determined at operation 425, a signal portion associated with another phase is selected and processed from operation 415 in substantially the same manner described above.

Once the signal portions for phases are processed as determined at operation 425, the signal portions are combined to construct a virtual voltage signal (e.g., for a period of T/2) emulating the root mean square (RMS) voltage of any of the phases at operation 435. For example, negative sample values of signal portions are converted to corresponding positive values, and the signal portions are arranged in order of their angles (or angle ranges) (e.g., sample values of the signal portions are appended to each other according to the angle (or angle range) of the signal portions to produce a virtual signal of voltage samples). Since the sample window has a duration of π/3 for a three-phase system, the resulting virtual voltage signal has a period of π (e.g., three signal portions each of duration π/3, or 3 phases X π/3=π=T/2).

The virtual voltage signal is used to determine a root mean square (RMS) value of the voltage for voltage fault detection at operation 440. The sample values of the virtual voltage signal produce the same RMS values as the actual signal of any of the phases.

With continued reference to FIGS. 1-4, FIG. 5 illustrates a graphical representation 500 of constructing a virtual voltage signal for a root mean square (RMS) calculation from voltage samples in a shortened sample window according to an embodiment of the present disclosure. Initially, samples 510, 520, and 530 from corresponding voltage signals 310, 320, and 330 (FIG. 3) of a three-phase system are captured in a sample window 505. Voltage signals 310, 320, and 330 are alternating current (AC) signals each having a sinusoidal waveform as described above. The duration of the sample window is T/6 (e.g., T/2/(N phases) =2π/6=π/3, where T (the period of the signals)=2π and N=3 phases). This duration is a shortened or reduced duration relative to a duration of T/2 (half of the period of the signals) for conventional approaches.

Figure 5:
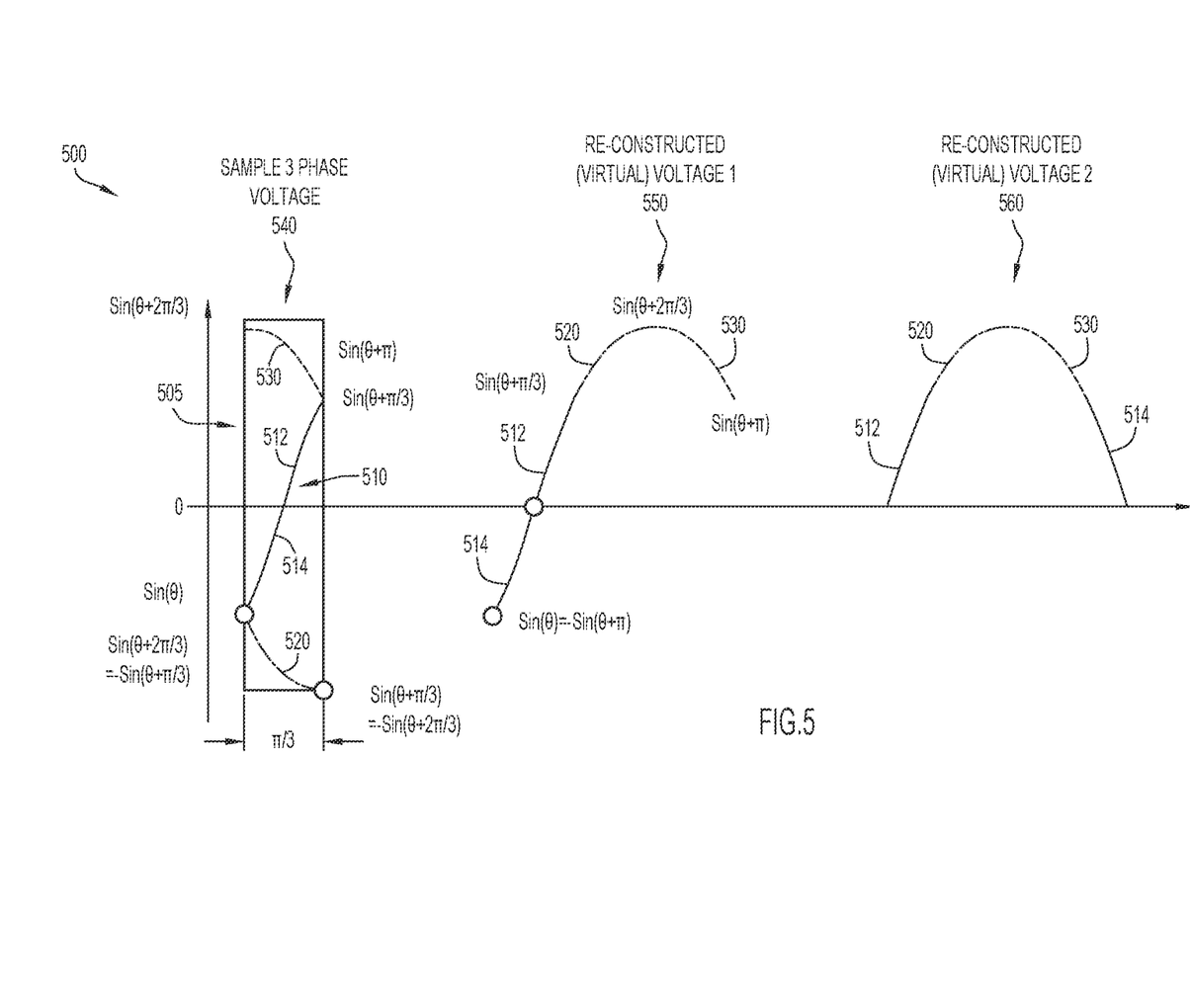
FIG. 5 is a graphical illustration of constructing a virtual voltage signal from portions of signals from a multi-phase power system captured within a sample window according to an embodiment of the present disclosure.

Sample window 505 includes samples or signal portion 510 from voltage signal 310, samples or signal portion 520 from voltage signal 320, and samples or signal portion 530 from voltage signal 330. A virtual voltage signal is re-constructed from the measured voltage signals 510, 520, and 530 of sample window 505 (of duration T/6 (or π/3)). By way of example, sample window 505 captures signal portions 510, 520, and 530 with respect to θ=−π/6 (or 300°). The reconstructed or virtual voltage signal is used for root mean square (RMS) calculations. The virtual voltage signal is valid for any angle, provided the voltage signals of the three-phase system are sinusoidal and symmetrical (e.g., voltage signals have a T/3 (or 2π/3) phase difference between them, etc.).

The virtual voltage signal is constructed by combining signal portions 510, 520, and 530 of sample window 505. In this example case, the voltage signals 510, 520, and 530 are sinusoidal and symmetrical (e.g., the voltage signals have a T/3 (or 2π/3) phase difference between them, etc.). For example, signal portion 510 may be represented at the start of sample window 505 by Sin(θ) and at the end of sample window 505 by Sin(θ+π/3) based on the duration (π/3) of the sample window. Signal portion 520 may be represented at the start of sample window 505 by Sin(θ−2π/3) (e.g., corresponding to a phase difference of −2π/3 from signal 510) and at the end of sample window 505 by Sin(θ−π/3) based on the duration (π/3) of the sample window. Signal portion 530 may be represented at the start of sample window 505 by Sin(θ+2π/3) (e.g., corresponding to a phase difference of +2π/3 from signal 510) and at the end of sample window 505 by Sin(θ+π) based on the duration (π/3) of the sample window.

The signal portions within sample window 505 are examined, and signal portions with negative values are converted to (or shifted to portions of the signal at angles with) corresponding positive values. The signal portions with positive values maintain their current angle (or angle range). The signal portions are combined and ordered according to the resulting angles (or angle ranges) of the signal portions. Since sample window 505 has a duration of π/3 and three-phase signals are utilized, the resulting virtual voltage signal has a period of π (e.g., three signal portions each of duration π/3, or 3 phases X π/3=π=T/2).

By way of example, an intermediate virtual voltage signal 550 may be constructed by initially identifying signal portion 520 as having negative values. Signal portion 520 may be represented at the start of sample window 505 by Sin(θ−2π/3) and at the end of sample window 505 by Sin(θ−π/3) based on the duration (π/3) of the sample window as described above. However, due to sinusoidal properties of the waveform (e.g., −Sin(θ)=Sin(θ+T)), Sin(θ−2π/3)=−Sin(θ+π/3) and Sin(θ−π/3)=−Sin(θ+2π/3). In other words, the negative values of signal portion 520 from Sin(θ−2π/3) to Sin(θ−π/3) in sample window 505 correspond to positive values of the sinusoidal waveform from Sin(θ+π/3) to Sin(θ+2π/3) (e.g., signal portion 520 is shifted by π, etc.).

Signal portion 510 includes positive portion 512 with positive values and negative portion 514 with negative values. Signal portion 510 extends from Sin(θ) to Sin(θ+π/3). Signal portion 520 has a resulting angle (or angle range) (after shifting) from Sin(θ+π/3) to Sin(θ+2π/3), and signal portion 530 has an angle (or angle range) from Sin(θ+2π/3) to Sin(θ+π). The signal portions may be combined in order of the angles (or angle ranges) to produce intermediate virtual voltage signal 550. For example, intermediate virtual voltage signal 550 may include signal portion 510 (including positive portion 512 and negative portion 514) from Sin(θ) to Sin(θ+π/3). Shifted signal portion 520 may extend from the end of positive portion 512 (at Sin(θ+π/3)) to Sin(θ+2π/3). In addition, signal portion 530 may extend from the end of shifted signal portion 520 (at Sin(θ+2π/3)) to Sin(θ+π).

Since negative portion 512 of signal portion 510 has negative values, the negative portion is converted to (or shifted to portions of the signal at phases with) corresponding positive values to produce resulting virtual voltage signal 560. The negative portion may be converted (or shifted) in substantially the same manner described above for signal portion 520. Negative portion 514 may be represented at the start of sample window 505 by Sin(θ) and extend to an angle having a voltage of zero. However, due to sinusoidal properties of the waveform (e.g., −Sin(θ)=Sin(θ+π)), the negative values of negative portion 514 from Sin(θ) to an angle having a zero voltage in sample window 505 correspond to positive values of the sinusoidal waveform from Sin(θ+π) (e.g., negative portion 514 is shifted by π, etc.). Negative portion 514 of intermediate virtual voltage signal 550 may be replaced with the shifted portion having positive values and extend from the end of signal portion 530 (at Sin(θ+π)) to produce resulting virtual voltage signal 560 (from angle 0 to π).

With continued reference to FIGS. 1-5, FIG. 6 illustrates a graphical representation 600 of constructing another virtual voltage signal for root mean square (RMS) calculation from samples in a shortened sample window according to an embodiment of the present disclosure. Initially, samples 610, 620, and 630 from corresponding voltage signals 310, 320, and 330 (FIG. 3) of a three-phase system are captured in a sample window 605. Voltage signals 310, 320, and 330 are alternating current (AC) signals each having a sinusoidal waveform as described above. The duration of the sample window is T/6 (e.g., T/2/(N phases)=2π/6=π/3, where T (the period of the signals)=2π and N=3 phases). This duration is a shortened or reduced duration relative to a duration of T/2 (half of the period of the signals) for conventional approaches.

Figure 6:
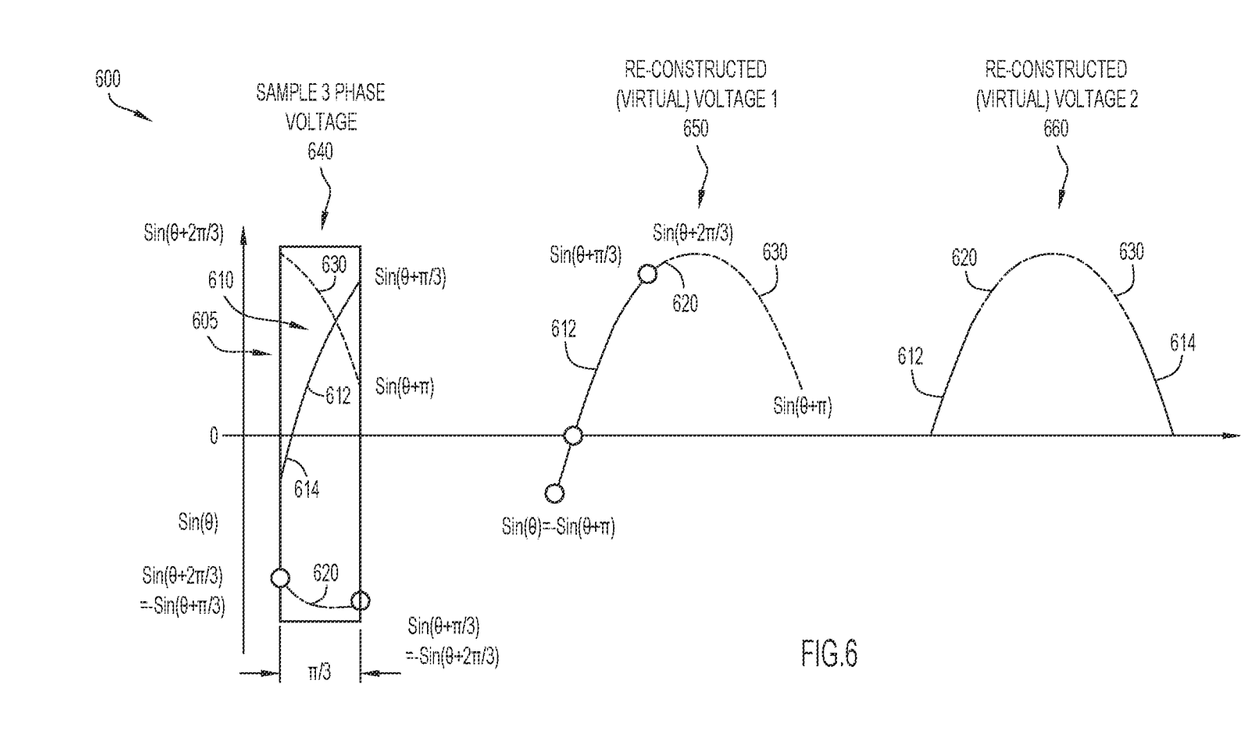
FIG. 6 is a graphical illustration of constructing a virtual voltage signal from signal portions within the sample window capturing a different section of the multi-phase power system signals according to an embodiment of the present disclosure.

Sample window 605 includes samples or signal portion 610 from signal 310, samples or signal portion 620, and samples or signal portion 630 from signal 330. A virtual voltage signal is re-constructed from the measured voltage signals 610, 620, and 630 of sample window 605 (of duration T/6 (or π/3)). By way of example, sample window 605 captures signal portions 610, 620, and 630 with respect to a different angle, θ, than FIG. 5. The reconstructed or virtual voltage signal is used for root mean square (RMS) calculations. The virtual voltage signal is valid for any angle, provided the voltage signals are sinusoidal and symmetrical (e.g., three-phase voltage signals have a T/3 (or 2π/3) phase difference between them, etc.).

The virtual voltage signal is constructed by combining signal portions of 610, 620, and 630 of sample window 605. In this example case, the voltage signals 310, 320, and 330 are sinusoidal and symmetrical (e.g., the voltage signals have a T/3 (or 2π/3) phase difference between them, etc.). For example, signal portion 610 may be represented at the start of sample window 605 by Sin(θ) and at the end of sample window 605 by Sin(θ+π/3) based on the duration ($\pi/3$) of the sample window. Signal portion 620 may be represented at the start of sample window 605 by $\text{Sin}(\theta-2\pi/3)$ (e.g., corresponding to a phase difference of $-2\pi/3$ from signal 610) and at the end of sample window 605 by $\text{Sin}(\theta-\pi/3)$ based on the duration ($\pi/3$) of the sample window. Signal portion 630 may be represented at the start of sample window 605 by $\text{Sin}(\theta+2\pi/3)$ (e.g., corresponding to a phase difference of $+2\pi/3$ from signal 610) and at the end of sample window 605 by $\text{Sin}(\theta+\pi)$ based on the duration ($\pi/3$) of the sample window.

The signal portions within sample 605 are examined, and signal portions with negative values are converted to (or shifted to portions of the signal at angles with corresponding positive values) in substantially the same manner described above. The signal portions with positive values maintain their current angle (or angle range), and the signal portions are combined and ordered according to the resulting angles (or angle ranges) in substantially the same manner described above.

By way of example, an intermediate virtual voltage signal 650 may be constructed by initially identifying signal portion 620 as having negative values. Signal portion 620 may be represented at the start of sample window 605 by $\text{Sin}(\theta-2\pi/3)$ and at the end of sample window 605 by $\text{Sin}(\theta-\pi/3)$ based on the duration ($\pi/3$) of the sample window as described above. However, due to sinusoidal properties of the waveform (e.g., $-\text{Sin}(\theta)=\text{Sin}(\theta+\pi)$), $\text{Sin}(\theta-2\pi/3)=-\text{Sin}(\theta+\pi/3)$ and $\text{Sin}(\theta-\pi/3)=-\text{Sin}(\theta+2\pi/3)$. In other words, the negative values of signal portion 620 from $\text{Sin}(\theta-2\pi/3)$ to $\text{Sin}(\theta-\pi/3)$ in sample window 605 correspond to positive values of the sinusoidal waveform from $\text{Sin}(\theta+\pi/3)$ to $\text{Sin}(\theta+2\pi/3)$ (e.g., signal portion 620 is shifted by $\pi$, etc.).

Signal portion 610 includes positive portion 612 with positive values and negative portion 614 with negative values. Signal portion 610 extends from $\text{Sin}(\theta)$ to $\text{Sin}(\theta+\pi/3)$. Signal portion 620 has a resulting angle (or angle range) (after shifting) from $\text{Sin}(\theta+\pi/3)$ to $\text{Sin}(\theta+2\pi/3)$, and signal portion 630 has an angle (or angle range) from $\text{Sin}(\theta+2\pi/3)$ to $\text{Sin}(\theta+\pi)$. The signal portions may be combined in order of the angles (or angle ranges) to produce intermediate virtual voltage signal 650. For example, intermediate virtual voltage signal 650 may include signal portion 610 (including positive portion 612 and negative portion 614) from $\text{Sin}(\theta)$ to $\text{Sin}(\theta+\pi/3)$. Shifted signal portion 620 may extend from the end of positive portion 612 (at $\text{Sin}(\theta+\pi/3)$) to $\text{Sin}(\theta+2\pi/3)$. In addition, signal portion 630 may extend from the end of shifted signal portion 620 (at $\text{Sin}(\theta+2\pi/3)$) to $\text{Sin}(\theta+\pi)$.

Since negative portion 612 of signal portion 610 has negative values, the negative portion is converted to (or shifted to portions of the signal at angles with) corresponding positive values to produce resulting virtual voltage signal 660. The negative portion may be converted (or shifted) in substantially the same manner described above for signal portion 620. Negative portion 614 may be represented at the start of sample window 605 by $\text{Sin}(\theta)$ and extend to an angle having a voltage of zero. However, due to sinusoidal properties of the waveform (e.g., $-\text{Sin}(\theta)=\text{Sin}(\theta+\pi)$), the negative values of negative portion 614 from $\text{Sin}(\theta)$ to an angle having a zero voltage in sample window 605 correspond to positive values of the sinusoidal waveform from $\text{Sin}(\theta+\pi)$ (e.g., negative portion 614 is shifted by $\pi$, etc.). Negative portion 614 of intermediate virtual voltage signal 650 may be replaced with the shifted portion having positive values and extend from the end of signal portion 630 (at $\text{Sin}(\theta+\pi)$) to produce resulting virtual voltage signal 660 (from angle $\theta$ to $\pi$).

A virtual voltage signal may be re-constructed from measured three-phase voltages during a sample window of duration T/6 (or $\pi/3$) at any angle, $\theta$, and may be used with a different phase sequence.

With continued reference to FIGS. 1-6, FIG. 7 illustrates a power transfer system 700 switching between power sources and employing voltage fault detection according to an embodiment of the present disclosure. By way of example, power transfer system 700 may include a static automatic bus transfer (SABT) system. The SABT system provides an interface between two power sources (e.g., normal and alternate power sources) and a critical load, and includes silicon controlled rectifier (SCR) circuits to control the switching between the power sources.

Figure 7:
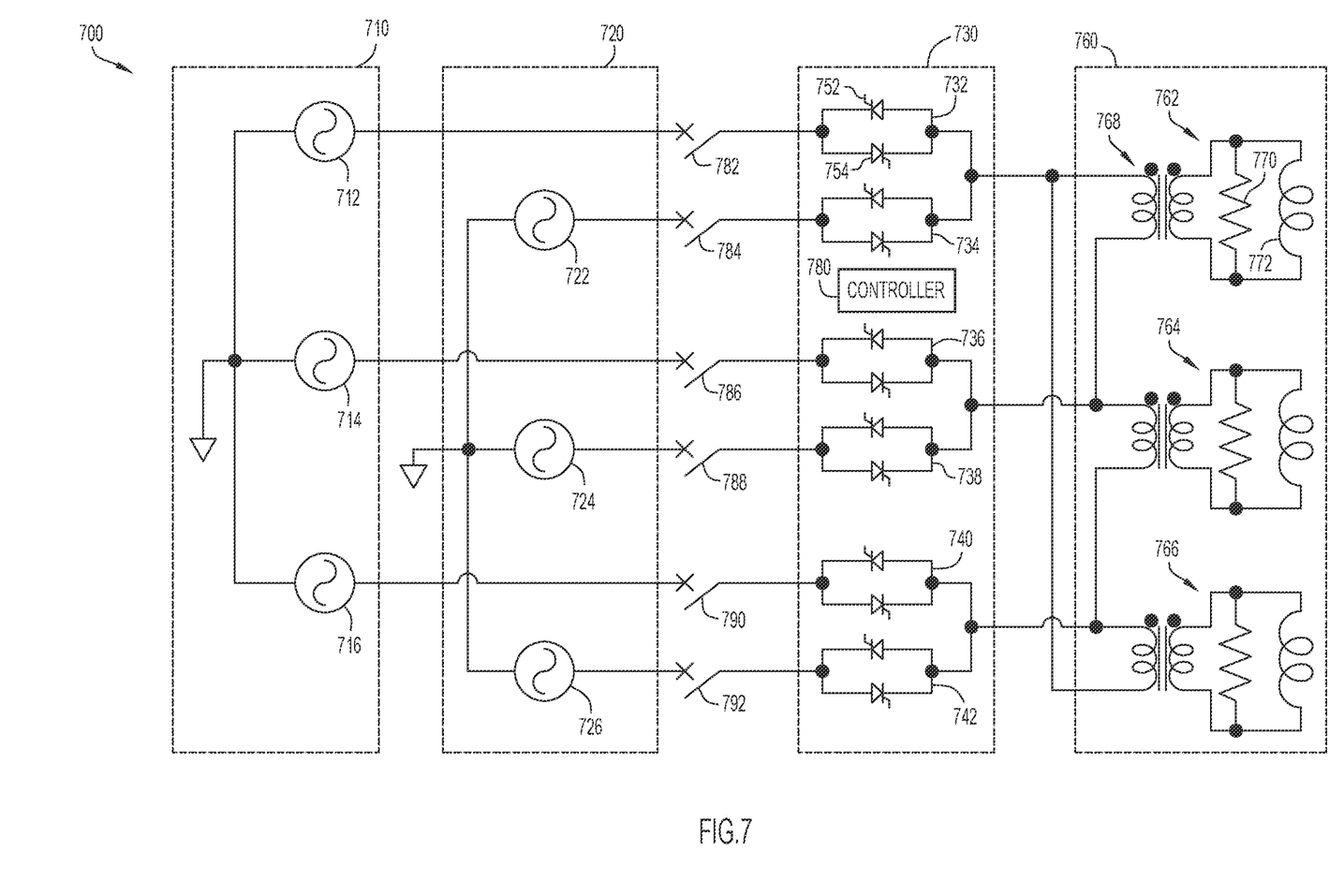
FIG. 7 is a schematic illustration of a static transfer switch system between power sources and employing voltage fault detection according to an embodiment of the present disclosure.

By way of example, power transfer system 700 includes a primary or normal power source 710, an alternate power source 720, a power transfer (or SABT) circuit 730, and a critical load circuit 760. Primary power source 710 includes power supplies 712, 714, 716. The power supplies of primary power source 710 may be any conventional or other power sources, and may each provide an alternating current (AC) signal at a different phase. For example, power sources 712, 714, 716 may respectively provide voltage signals substantially similar to voltage signals 310, 320, 330 (FIG. 3) described above. Alternate power source 720 includes power supplies 722, 724, 726. The power sources of alternate power source 720 may be any conventional or other power sources, and may each provide an alternating current (AC) signal at a different phase. The AC signals of power supplies 722, 724, 726 may respectively correspond to the AC signals from power supplies 712, 714, 716.

Critical load circuit 760 includes transformer assemblies 762, 764, and 766. Each transformer assembly includes a transformer 768, a resistor 770, and an inductor 772. Resistor 770 and inductor 772 are disposed in parallel with each other and with secondary windings of transformer 768. The primary windings of the transformer of transformer assembly 762 are coupled to the primary windings of the transformer of transformer assembly 764. Similarly, the primary windings of the transformer of transformer assembly 764 are coupled to the primary windings of the transformer of transformer assembly 766. In addition, the primary windings of the transformer of transformer assembly 766 are coupled to the combined output of silicon controlled rectifier (SCR) circuits 732, 734.

Since critical load circuit 760 requires voltage at all times, power transfer (or SABT) circuit 730 monitors the voltage to critical load circuit 760, and switches between primary power source 710 and alternate power source 720 in response to detecting a low voltage fault. In other words, power transfer (or SABT) circuit 730 may connect a selected power source (e.g., primary power source 710 or alternate power source 720) to critical load circuit 760. Power transfer (or SABT) circuit 730 includes silicon control rectifier (SCR) circuits 732, 734, 736, 738, 740, 742, and a controller 780. Each SCR circuit includes a pair of SCRs 752, 754 arranged in parallel and oriented in opposing directions (e.g., to enable current flow from AC signals). Each SCR circuit receives power signals from a corresponding power supply of primary source 710 or alternate power source 720 via a corresponding switch controlled by controller 780. For example, SCR circuit 732 is coupled to power supply 712 of primary power source 710 via a switch 782. SCR circuit 734 is coupled to power supply 722 of alternate power source 720 via switch 784. The junctions of SCR circuits 732, 734 are coupled to each other to provide current to transformer assembly 762 of critical load circuit 760. Controller 780 monitors the power signals from both power sources to detect voltage faults and control switches 782, 784.

SCR circuit 736 is coupled to power supply 714 of primary power source 710 via a switch 786. SCR circuit 738 is coupled to power supply 724 of alternate power source 720 via switch 788. The junctions of SCR circuits 736, 738 are coupled to each other to provide current to transformer assembly 764 of critical load circuit 760. Controller 780 monitors the power signals from both power sources to detect voltage faults and control switches 786, 788.

In addition, SCR circuit 740 is coupled to power supply 716 of primary power source 710 via a switch 790. SCR circuit 742 is coupled to power supply 726 of alternate power source 720 via switch 792. The junctions of SCR circuits 740, 742 are coupled to each other and provide current to transformer assembly 766 of critical load circuit 760. Controller 780 monitors the power signals from both power sources to detect voltage faults and control switches 792, 794.

When a selected power source has a fault, power transfer (or SABT) circuit 730 detects the fault and quickly transfers load current to a remaining healthy source to ensure the voltage/power to critical load circuit 760 is maintained. For example, when an undervoltage (UV) or overvoltage (OV) fault is detected in primary source 710, power transfer (or SABT) circuit 730 may switch from primary power source 710 to alternate power source 720. Controller 780 of the power transfer (or SABT) circuit monitors and detects voltage faults by employing virtual voltage signals and shortened sample windows in substantially the same manner described herein. By way of example, the AC voltage signals may have a frequency of 60 Hz and be sampled at a rate to obtain 32 samples per half-period (or 3.84 kHz). However, any suitable sampling rate (or sample window) may be used (e.g., a rate of 10 kHz or more, etc.). Virtual voltage signals reduce undervoltage (UV) or overvoltage (OV) fault detection time and transfer time in the system during the transient or switching of power sources. Controller 780 of power transfer (or SABT) circuit 730 monitors voltage and current at the inputs and outputs of power transfer (or SABT) circuit 730, and uses volt balancing control for switching between the power sources to reduce transient saturation of the transformer windings.

With continued reference to FIGS. 1-7, FIG. 8 illustrates a graphical representation 800 of enable signals for switching between the power sources in the power transfer system of FIG. 7 according to an embodiment of the present disclosure. Initially, graphical representation 800 shows a timing diagram for enable signals for SCRs 752, 754 of silicon controlled rectifier (SCR) circuits 732, 736, and 740 for primary power source 710 and enable signals for SCRs 752, 754 of silicon controlled rectifier (SCR) circuits 734, 738, and 742 for alternate power source 720. Initially, a voltage fault may occur at time t1 and be detected at time t2. Thus, the detection time is the difference between the time of detection and the time of fault (e.g., t2-t1 as viewed in FIG. 8). The transfer time (time to transfer between power sources 710 and 720) is the difference between the time of the fault and the time each of the enable signals for alternate power source 720 are activated (e.g., t6-t1 as viewed in FIG. 8). It is desirable to make the transfer time as small as possible (e.g., in a SABT or other system) to minimize voltage interruption to the critical load during transient (or switching between power sources). Reduced fault detection time may further reduce transfer time. Accordingly, power transfer system 700 may employ techniques of embodiments of the present disclosure to reduce detection time and, hence, the transfer time.

Figure 8:
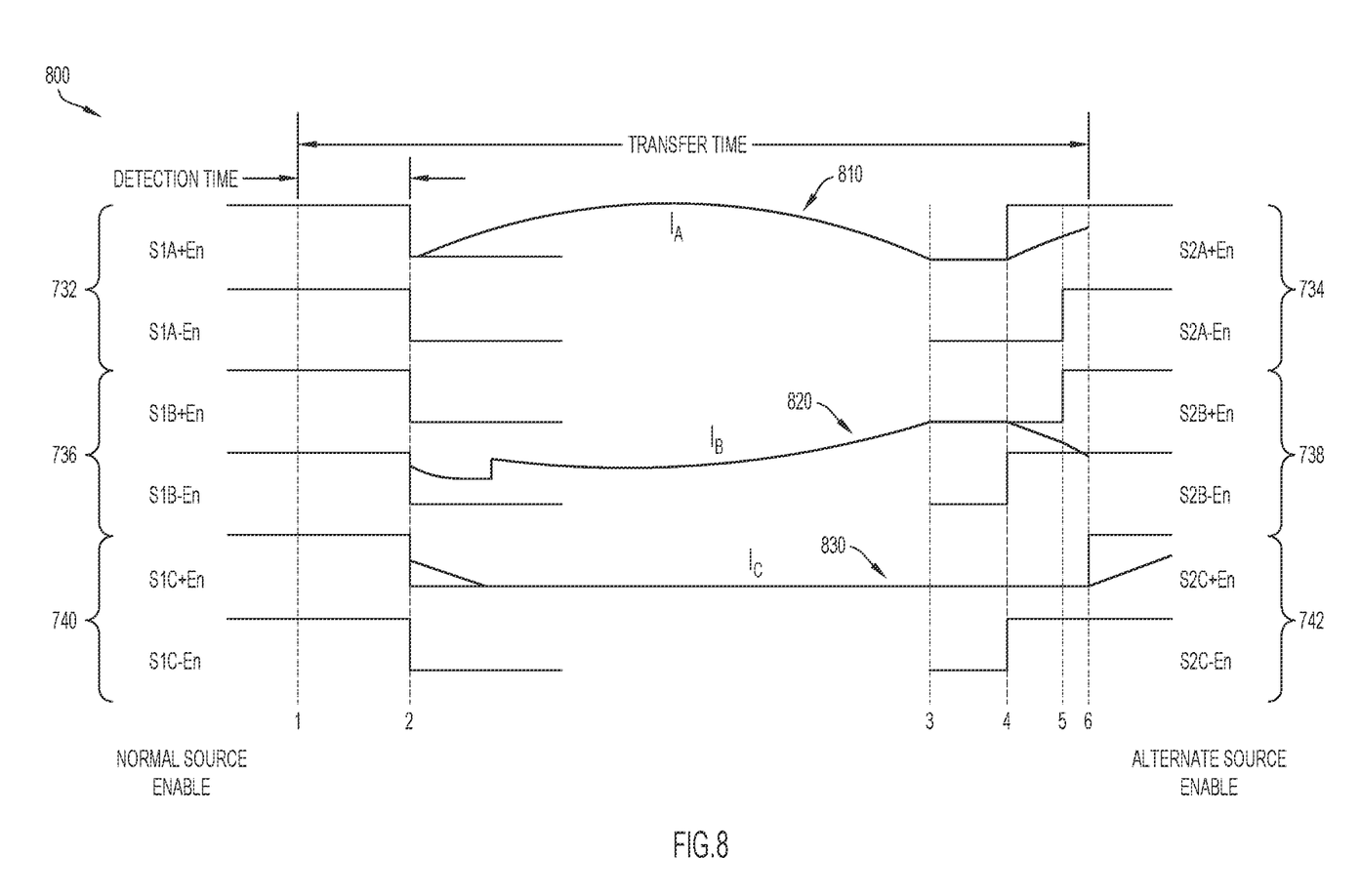
FIG. 8 is a graphical illustration of a timing diagram for switching between the power sources in the power transfer system of FIG. 7 according to an embodiment of the present disclosure.

When a fault is detected at time, t2, the enable signals for SCRs 752, 754 of silicon controlled rectifier (SCR) circuits 732, 736, 740 are disabled. However, current 810 ($I_A$, corresponding to SCR circuit 732), current 820 ($I_B$, corresponding to SCR circuit 736), and current 830 ($I_C$, corresponding to SCR circuit 740) do not immediately cease but, rather, gradually decrease over time after disablement of the enable signals. When a zero crossing is attained by all of current 810, 820, 830 at time t3, a portion of enable signals for SCRs 752, 754 of SCR circuits 734, 738, 742 are enabled at time t4 to balance voltage and prevent current rush for the transformers of critical load circuit 760 for power transfer to alternate power source 720. Enable signals for SCRs 752, 754 of remaining SCR circuits 634, 638, 642 are activated for the alternate power source at times t5 and t6 to enable switching from primary power source 710 to alternate power source 720.

Embodiments of the present disclosure provide a reduced detection time (based on a shortened sample window) which reduces the transfer time. For example, when detection of a fault (or time t2) occurs later (due to a larger sample window), the enable signals for SCRs 752, 754 of silicon controlled rectifier (SCR) circuits 732, 736, 740 are disabled at that later time. This delays the time of zero crossing for current 810 ($I_A$), 820 ($I_B$), 830 ($I_C$), thereby delaying activation of enable signals for SCRs 752, 754 of SCR circuits 734, 738, 742 for transfer to the alternate power source. Consequently, the delay of activation of the enable signals for the alternate power source increases the transfer time. In other words, the delay in time of detection propagates to the remaining events which increases the overall transfer time.

Embodiments of the present disclosure reduce a sample window from T/2 to T/6 in a three-phase system. The reduced sample window enables less delay in root mean square (RMS) measurements/calculations. This produces quick fault detection that enables fast reaction and reduced regulation time, thereby enabling a load to experience a smaller disturbance and over-shoot/under-shoot.

With continued reference to FIGS. 1-8, FIG. 9 illustrates a graphical representation 900 of fault detection and transfer times for embodiments of the present disclosure relative to conventional techniques. Initially, graphical representation 900 includes a horizontal axis for phase difference (degrees) and the vertical axis represents delay (milliseconds (ms)). By way of example, graphical representation 900 shows detection and transfer times for undervoltage (UV) fault detection of power transfer system 700 (FIG. 7) with different phase differences between the sources.

Figure 9:
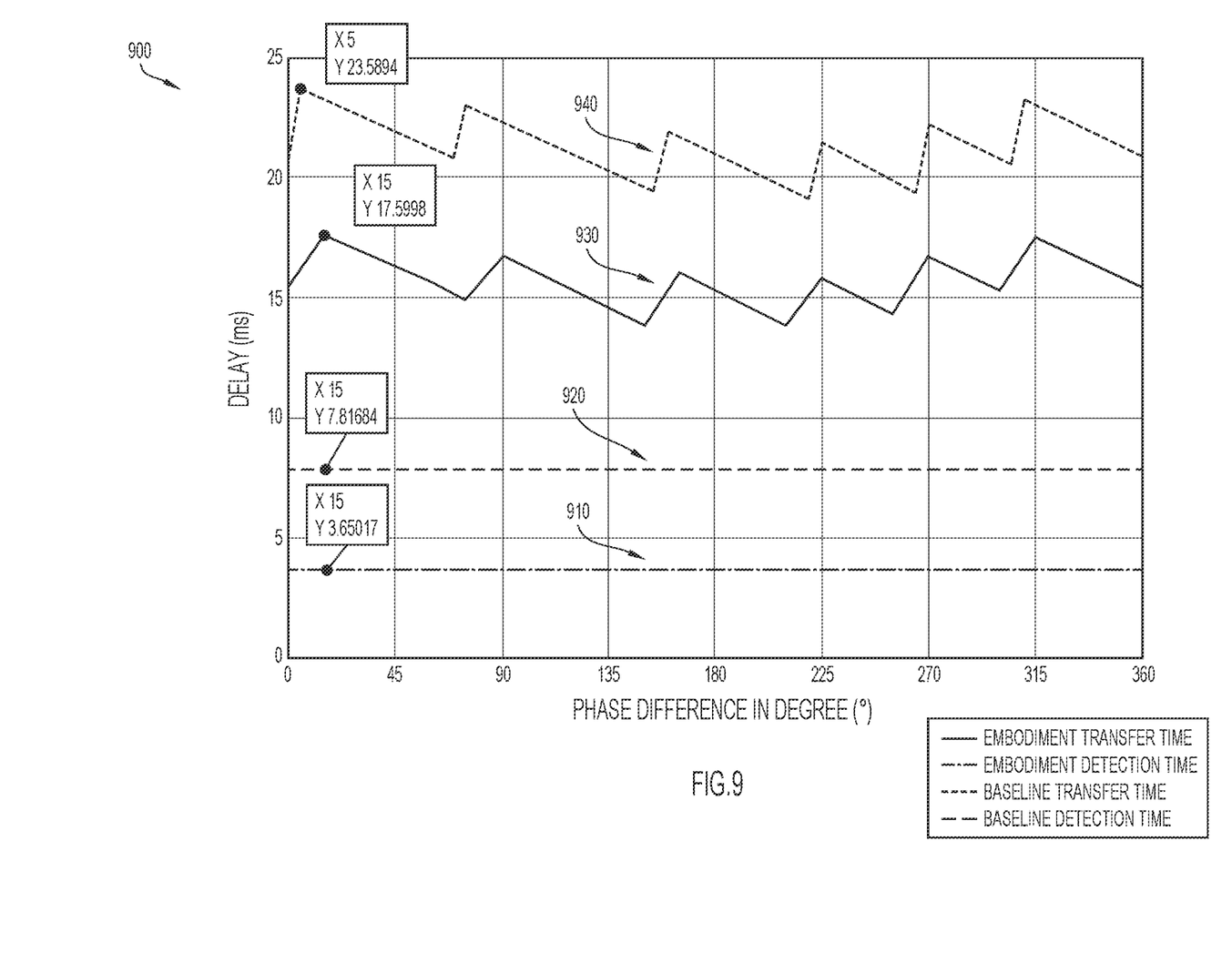
FIG. 9 is a graphical illustration of voltage fault detection and transfer times for the power transfer system of FIG. 7 of an embodiment of the present disclosure relative to conventional techniques.

For example, plot 910 represents the undervoltage (UV) fault detection time of present embodiments using virtual voltage signals and a shortened sample window (e.g., T/6) in a static automatic bus transfer (SABT) system (FIG. 7). Plot 920 represents the fault detection time for conventional techniques employing a larger sample window (e.g., T/2). The detection times of plots 910, 920 are constant since detection time is based on the sample window which is fixed. In this case, the undervoltage (UV) fault detection time is reduced by present embodiments from approximately 7.8 ms for conventional techniques to about 3.6 ms by using virtual voltage signals (a reduction of approximately 53%).

By way of further example, plot 930 represents the transfer time (e.g., time to transfer between power sources) for the undervoltage (UV) fault detection of present embodiments (e.g., using a sample window of T/6). Plot 940 represents the transfer time for conventional techniques (e.g., using a sample window of T/2). The transfer times of plots 930, 940 are not constant since transfer time is related to the voltage balancing, controller parameters, and phase difference between two sources. In this case, the maximum transfer time is reduced by present embodiments from approximately 23.6 ms for conventional techniques to about 17.6 ms by using virtual voltage signals (a reduction of approximately 25%).

Figure 10:
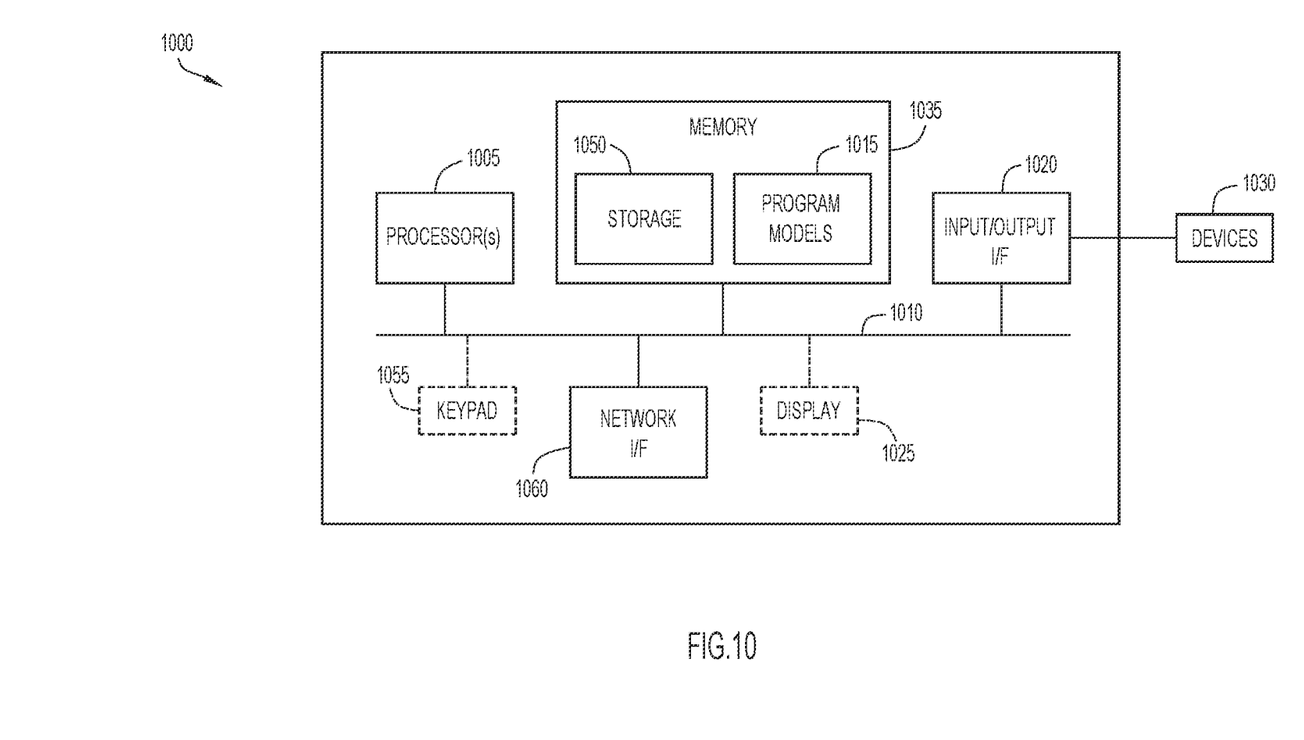
FIG. 10 is a block diagram of an example computing device according to an embodiment of the present disclosure.

An example of a computing device 1000 (e.g., implementing controller 780, etc.) is illustrated in FIG. 10. The example computing device may perform the functions of embodiments described herein. Computing device 1000 may be implemented by any personal or other type of computer or processing system (e.g., embedded processor, microprocessor, controller, etc.), and may be used for any computing environments (e.g., embedded, local, network computing, stand-alone systems, etc.).

Computing device 1000 may include one or more processors 1005 (e.g., microprocessor, controller, central processing unit (CPU), etc.), network interface 1060, memory 1035, a bus 1010, and an Input/Output interface 1020. Bus 1010 couples these components for communication, and may be of any type of bus structure, including a memory bus or memory controller, a peripheral bus, and a processor or local bus using any of a variety of conventional or other bus architectures. Memory 1035 is coupled to bus 1010 and typically includes computer readable media including volatile media (e.g., random access memory (RAM), cache memory, etc.), non-volatile media, removable media, and/or non-removable media. For example, memory 1035 may include storage 1050 containing nonremovable, non-volatile media.

Moreover, memory 1035 includes a set of program modules 1015 that are configured to perform functions of embodiments described herein. The memory may further include an operating system, at least one application and/or other modules, and corresponding data. These may provide an implementation of a networking environment.

Input/Output interface 1020 is coupled to bus 1010 and communicates with one or more peripheral or external devices 1030 (e.g., a keyboard, mouse or other pointing device, a display, sensing devices, etc.), at least one device that enables a user to interact with computing device 1000, and/or any device (e.g., network card, modem, etc.) that enables computing device 1000 to communicate with one or more other computing devices. Computing device 1000 may communicate with one or more networks (e.g., a local area network (LAN), a wide area network (WAN), a public network (e.g., the Internet), etc.) via network interface 1060 coupled to bus 1010.

With respect to certain entities, computing device 1000 may further include, or be coupled to, a touch screen or other display 1025 and/or a keypad or keyboard 1055 to enter information (e.g., alphanumeric information, etc.). These items may be coupled to bus 1010 or Input/Output interface 1020 to transfer data with other elements of computing device 1000.

The embodiments have been described in the context of multi-phase power systems, by way of example only. It is understood that the embodiments apply equally well to other AC or sinusoidal signals of any phases to produce voltage or other measurements in a shortened sampling interval. The embodiments may use any desired sampling rate, and perform any calculations or determinations based on the virtual signal. Further, present embodiments may be used for fault detection in any suitable systems having appropriate waveforms (e.g., power systems, communication systems, etc.).

The hardware environment of the embodiments may include any number of computer or other processing systems (e.g., computing devices, etc.) and repositories arranged in any desired fashion, where the embodiments may be applied to any desired type of computing environment. The computing or other processing systems employed by the embodiments may be implemented by any number of any type of computer or processing system (e.g., microprocessor, controller, embedded processor, hand-held devices, etc.), and may include any commercially available operating system. These systems may include any types of monitors and input devices (e.g., keyboard, mouse, voice recognition, etc.) to enter and/or view information.

It is to be understood that the software of the embodiments (e.g., program modules 1015 implementing the functions of present embodiments described herein, etc.) may be implemented in any desired computer language and could be developed by one of ordinary skill in the computer arts based on the functional descriptions contained in the specification and flow diagrams illustrated in the drawings. Further, any references herein of software performing various functions generally refer to computer systems or processors performing those functions under software control. The computer systems of the embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the embodiments may be distributed in any manner among the various computing devices and and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the embodiments (e.g., program modules 1015 implementing the functions of present embodiments described herein, etc.) may be available on a non-transitory computer useable or readable medium (e.g., magnetic or optical mediums, magneto-optic mediums, CD-ROM, DVD, memory devices, etc.) of a stationary or portable computer program product, apparatus, or device for use with stand-alone systems or systems connected by a network or other communications medium. The computer useable or readable medium (or media) may include instructions executable by one or more processors to perform functions of embodiments described herein.

A communication network may be used by embodiments to convey voltage fault detection (or perform remote voltage fault detection) and may be implemented by any number of any type of communications network (e.g., LAN, WAN, Internet, Intranet, VPN, etc.). The computer or other processing systems of the embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database may be implemented by any number of any conventional or other databases, data stores or storage structures to store information. The database may be included within or coupled to the server. The database and/or storage structures may be remote from or local to the computer or other processing systems, and may store any desired data.

In summary, in one aspect, a method for detecting voltage faults is provided. The method comprises sampling a plurality of voltage signals each having a different phase in a sample window to capture signal portions. Each signal portion is associated with an angle range. Each signal portion in the sample window with negative values and the associated angle range is converted to a portion of a voltage signal producing that signal portion having corresponding positive values. A virtual voltage signal is generated by combining the signal portions with positive values based on associated angle ranges. A voltage value is determined based on the virtual voltage signal, and a voltage fault is detected based on the voltage value.

In another aspect, a system for detecting voltage faults is provided. The system comprises a controller that samples a plurality of voltage signals each having a different phase in a sample window to capture signal portions. Each signal portion is associated with an angle range. The controller converts each signal portion in the sample window with negative values and the associated angle range to a portion of a voltage signal producing that signal portion having corresponding positive values. The controller generates a virtual voltage signal by combining the signal portions with positive values based on associated angle ranges. The controller determines a voltage value based on the virtual voltage signal, and detects a voltage fault based on the voltage value.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method of detecting voltage faults comprising:
    sampling, via a controller of a power system, a plurality of voltage signals of the power system each having a different phase in a sample window to capture signal portions, wherein each signal portion is associated with an angle range;
    converting, via the controller, each signal portion in the sample window with negative values and the associated angle range to a portion of a voltage signal producing that signal portion having corresponding positive values;
    generating, via the controller, a virtual voltage signal by combining the signal portions with positive values based on associated angle ranges;
    determining, via the controller, a voltage value based on the virtual voltage signal; and
    detecting, via the controller, a voltage fault in the power system based on the voltage value.

2. The method of claim 1, wherein the voltage value is a root mean square (RMS) voltage value.

3. The method of claim 1, wherein a duration of the sample window is a period of the voltage signals divided by twice a quantity of phases of the voltage signals.

4. The method of claim 1, wherein the plurality of voltage signals include symmetric AC signals with a same phase difference.

5. The method of claim 4, wherein the power system includes a three-phase power system, and the plurality of voltage signals include voltage signals from the three-phase power system.

6. The method of claim 1, wherein converting each signal portion comprises:
    shifting the angle range of each signal portion in the sample window with negative values to the angle range of the portion of the voltage signal producing that signal portion having the corresponding positive values.

7. The method of claim 1, wherein a period of the virtual voltage signal is half a period of the plurality of voltage signals.

8. The method of claim 1, wherein the power system comprises a power transfer system including a first power source and a second power source, wherein the plurality of voltage signals are from the first power source, and the method further comprises:
    switching from the first power source to the second power source in response to detecting the voltage fault.

9. The method of claim 8, wherein the power transfer system includes a static automatic bus transfer system (SABT).

10. The method of claim 8, wherein the first power source and the second power source are three-phase power sources.

11. A system for detecting voltage faults comprising:
    a controller configured to:
        sample a plurality of voltage signals each having a different phase in a sample window to capture signal portions, wherein each signal portion is associated with an angle range;
        convert each signal portion in the sample window with negative values and the associated angle range to a portion of a voltage signal producing that signal portion having corresponding positive values;
        generate a virtual voltage signal by combining the signal portions with positive values based on associated angle ranges;
        determine a voltage value based on the virtual voltage signal; and
        detect a voltage fault based on the voltage value.

12. The system of claim 11, wherein the voltage value is a root mean square (RMS) voltage value.

13. The system of claim 11, wherein a duration of the sample window is a period of the voltage signals divided by twice a quantity of phases of the voltage signals.

14. The system of claim 11, wherein the plurality of voltage signals include symmetric AC signals with a same phase difference.

15. The system of claim 14, wherein the plurality of voltage signals include voltage signals from a three-phase power system.

16. The system of claim 11, wherein converting each signal portion comprises:
    shifting the angle range of each signal portion in the sample window with negative values to the angle range of the portion of the voltage signal producing that signal portion having the corresponding positive values.

17. The system of claim 11, wherein a period of the virtual voltage signal is half a period of the plurality of voltage signals.

18. The system of claim 11, further comprising:
a first power source and a second power source;
wherein the plurality of voltage signals are from the first power source, and the controller is further configured to:
switch from the first power source to the second power source in response to detecting the voltage fault.

19. The system of claim 18, wherein the system includes a static automatic bus transfer system (SABT).

20. The system of claim 18, wherein the first power source and the second power source are three-phase power sources.

* * * * *